US008854548B2

(12) United States Patent
Kim et al.

(10) Patent No.: US 8,854,548 B2
(45) Date of Patent: *Oct. 7, 2014

(54) MECHANISM FOR MEMORY REDUCTION IN PICTURE-IN-PICTURE VIDEO GENERATION

(71) Applicant: Silicon Image, Inc., Sunnyvale, CA (US)

(72) Inventors: Daekyeung Kim, Palo Alto, CA (US); Wooseung Yang, Santa Clara, CA (US); Young Il Kim, Sunnyvale, CA (US); Jeoong Sung Park, Cupertino, CA (US); Hoon Choi, Mountain View, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/145,736

(22) Filed: Dec. 31, 2013

(65) Prior Publication Data

US 2014/0111691 A1    Apr. 24, 2014

Related U.S. Application Data

(63) Continuation of application No. 12/816,437, filed on Jun. 16, 2010, now Pat. No. 8,698,958.

(51) Int. Cl.
*H04N 5/45* (2011.01)
*H04N 21/44* (2011.01)
*H04N 21/4402* (2011.01)
*G06T 1/60* (2006.01)
*H04N 21/2365* (2011.01)
*H04N 21/431* (2011.01)
*G06T 3/40* (2006.01)
*H04N 9/64* (2006.01)
*H04N 21/434* (2011.01)

(52) U.S. Cl.
CPC ............ *G06T 1/60* (2013.01); *H04N 21/44004* (2013.01); *H04N 21/440263* (2013.01); *H04N 21/4347* (2013.01); *H04N 5/45* (2013.01); *H04N 21/2365* (2013.01); *H04N 21/4316* (2013.01); *G06T 3/4084* (2013.01); *H04N 9/641* (2013.01)
USPC .......................................... 348/565; 348/567

(58) Field of Classification Search
CPC ..... H04N 5/45; H04N 5/445; H04N 5/44591; H04N 5/44543; H04N 21/4316; H04N 21/4622; H04N 21/4314; H04N 21/435; H04N 21/4858; H04N 21/4882; H04N 21/25435; H04N 21/2662; H04N 21/8126; H04N 9/8227; H04N 9/8205
USPC ......... 348/565, 564, 566, 567, 568, 588, 687, 348/377, 380, 705, 598
IPC ........................................................ H04N 5/45
See application file for complete search history.

(56) References Cited

U.S. PATENT DOCUMENTS

| 5,555,026 A | 9/1996 | Lee |
| 5,867,227 A | 2/1999 | Yamaguchi |
| 6,011,594 A | 1/2000 | Takashima |
| 7,023,494 B2 | 4/2006 | Yun |
| 7,142,252 B2 | 11/2006 | Song |
| 8,248,535 B2 | 8/2012 | He |

FOREIGN PATENT DOCUMENTS

| EP | 1054566 | 11/2000 |
| JP | 2002-125171 | 4/2002 |
| KR | 10-0426999 | 7/2004 |

OTHER PUBLICATIONS

PCT International Search Report and Written Opinion. PCT/US2011/039273, Mailed Date Jan. 18, 2012, 14 pages.

*Primary Examiner* — Trang U Tran
(74) *Attorney, Agent, or Firm* — Fenwick & West LLP

(57) ABSTRACT

A mechanism for memory reduction in picture-in-picture video generation is disclosed. A method of embodiments of the invention includes receiving, from a transmitting device, a plurality of video streams at a receiving device coupled to the transmitting device, wherein a first video stream of the plurality of video streams is designated to be displayed as a main video and one or more other video streams of the plurality of video streams are designated to be displayed as one or more sub videos to the main video. The method further includes transforming the one or more other video streams into the one or more sub videos, temporarily holding the one or more sub videos in a compressed frame buffer, and merging, via pixel replacement, the main video and the one or more sub videos into a final video image capable of being displayed on a single screen utilizing a display device, wherein pixel replacement is performed such that the one or more sub videos occupy one or more sections of pixels of screen space pixels occupied by the main video.

20 Claims, 6 Drawing Sheets

MECHANISM FOR MEMORY REDUCTION IN PICTURE-IN-PICTURE VIDEO GENERATION

CROSS-REFERENCE TO RELATED APPLICATION

This application is continuation application of U.S. patent application Ser. No. 12/816,437, entitled "MECHANISM FOR MEMORY REDUCTION IN PICTURE-IN-PICTURE VIDEO GENERATION", filed Jun. 16, 2010 and the benefit of and priority are claimed thereof and the entire contents of which are incorporated herein by reference.

FIELD

Embodiments of the invention generally relate to the field of electronic networks and, more particularly, to perform memory reduction in picture-in-picture video generation.

BACKGROUND

In the operation of a system that utilizes multiple data streams, such as multiple media data streams for display. The data may include data protected by High-bandwidth Digital Content Protection (HDCP) data, which is referred to herein as HDCP data. Communicating multiple media data streams may include a flow of content between a transmitting authority (e.g., cable television or satellite companies) and a receiving device (e.g., a television (TV)) via a transmission device (e.g., cable/satellite signal transmission device) through a High-Definition Multimedia Interface (HDMI). Picture-in-picture (PiP) is a feature of some video transmitters and receivers in which one programming channel is displayed on a full screen of a receiving device (e.g., television) at the same time as one or more other channels are displayed in inset windows of the full display screen. This technique allows receiving device viewers to see multiple channels in a single screen by mixing multiple video streams. However, since PiP requires a great deal of memory, it is primarily used for and implemented on general-purpose processor-based platforms that employ relatively large amounts of memory and are not suitable for smaller platforms, such as an Application-Specific Integrated Circuit (ASIC)-based platform. ASIC refers to integrated circuit that is not used for general purpose; rather, it is customized for a particular use (e.g., customized and particular for use with handheld devices, smart phones, etc.). Given that an ASIC-based platform is customized for a particular use, it does not contain memory large enough to accommodate a conventional implementation of PIP.

FIG. 1 illustrates a conventional mechanism for generating picture-in-picture video from multiple video streams. As illustrated, two incoming videos or video streams 102, 104 enter PiP processing area 106 as one video stream 102 is selected as main video 108 by the viewer, while the other video stream 2 104 is selected to be shown as sub video 110. Video stream 102 passes through main channel selection 112 and emerges main video 108 without any changes to it, such as with regard to its size, etc. Video stream 104, however, passes through sub channel selection 114 and then on to down sampling 116 where it is down-sampled and emerges as sub video 110. Down-sampling 116 refers to reduction in or sampling down of the image size of video stream 104 by a certain amount or ratio resulting in generation of sub video 110 which, as illustrated, is much smaller than the original video stream 104. Both videos 108, 110 are then put through the conventional video mixing process 118 which merges the two images 108, 110 to be displayed as main video 108 and sub video 110 on a single display screen, as illustrated.

FIG. 2 illustrates a conventional picture-in-picture implementation 200 designed to operate on a processor-based platform. Video or video streams 202, 204 enter chip 214 through video interfaces 206, 208 (e.g., HDMI), respectively, on to processor 210. Processor 210 receives and reads the original videos 202, 204 from their channels and stores them in memory 216. Processor 210 then perform down-sampling algorithm and stores the results, including main video 218 and down-sampled sub video 220, back in memory 216. Main video 218 and sub video 220 are then merged together by processor 210 to generate a single final image 222 that contains both the main video 218 and sub video 220. As illustrated, this conventional implementation 200 requires a rather large memory 216 to store at least one video image, main video 218, and in many cases multiple video images 218, 220. This PiP implementation 200 only works with a large-capacity external memory device 216, resulting in high manufacturing cost for television systems having a PiP feature and making it unsuitable for smaller devices, such as cellular phones.

SUMMARY

A mechanism for reduction of memory in picture-in-picture video generation is disclosed.

A method of embodiments of the invention includes receiving, from a transmitting device, a plurality of video streams at a receiving device coupled to the transmitting device, wherein a first video stream of the plurality of video streams is designated to be displayed as a main video and one or more other video streams of the plurality of video streams are designated to be displayed as one or more sub videos to the main video. The method further includes transforming the one or more other video streams into the one or more sub videos, temporarily holding the one or more sub videos in a compressed frame buffer, and merging, via pixel replacement, the main video and the one or more sub videos into a final video image capable of being displayed on a single screen utilizing a display device, wherein pixel replacement is performed such that the one or more sub videos occupy one or more sections of pixels of screen space pixels occupied by the main video.

A system of embodiments of the invention includes a data processing device having a storage medium and a processor coupled with the storage medium, the data processing device further having a picture-in-picture video generation mechanism. The picture-in-picture video generation mechanism to receive, from a transmitting device, a plurality of video streams at a receiving device coupled to the transmitting device, wherein a first video stream of the plurality of video streams is designated to be displayed as a main video and one or more other video streams of the plurality of video streams are designated to be displayed as one or more sub videos to the main video. The picture-in-picture video generation mechanism is further to transform the one or more other video streams into the one or more sub videos, temporarily hold the one or more sub videos in a compressed frame buffer, and merge, via pixel replacement, the main video and the one or more sub videos into a final video image capable of being displayed on a single screen utilizing a display device, wherein pixel replacement is performed such that the one or more sub videos occupy one or more sections of pixels of screen space pixels occupied by the main video.

An apparatus of embodiments of the invention includes a data processing device having a storage medium and a processor coupled with the storage medium, the processor to receive, from a transmitting device, a plurality of video streams at a receiving device coupled to the transmitting device, wherein a first video stream of the plurality of video streams is designated to be displayed as a main video and one or more other video streams of the plurality of video streams are designated to be displayed as one or more sub videos to the main video. The processor is further to transform the one or more other video streams into the one or more sub videos, temporarily hold the one or more sub videos in a compressed frame buffer, and merge, via pixel replacement, the main video and the one or more sub videos into a final video image capable of being displayed on a single screen utilizing a display device, wherein pixel replacement is performed such that the one or more sub videos occupy one or more sections of pixels of screen space pixels occupied by the main video.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
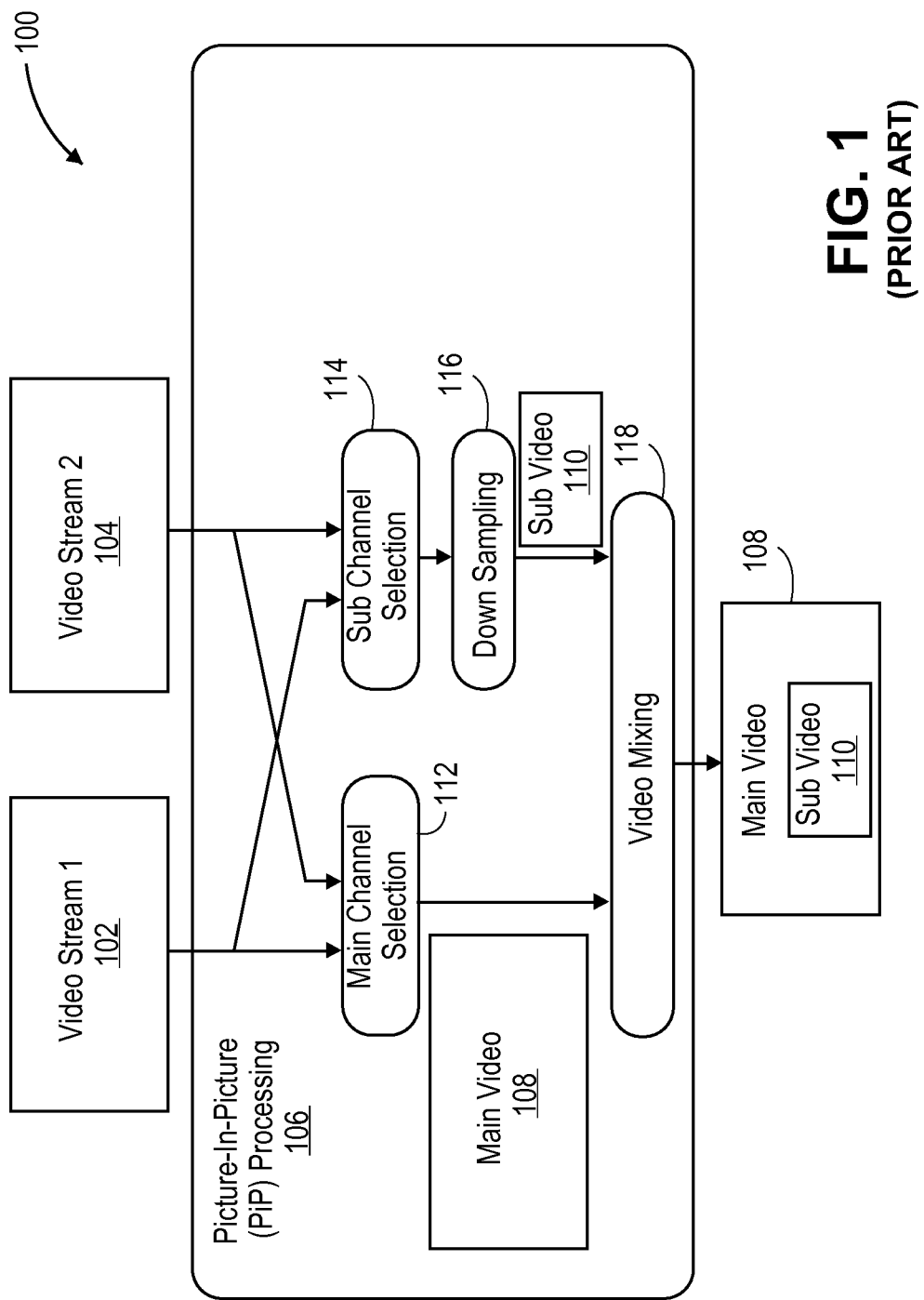
FIG. 1 illustrates a conventional mechanism for generating picture-in-picture video from multiple video streams.
Figure 2:
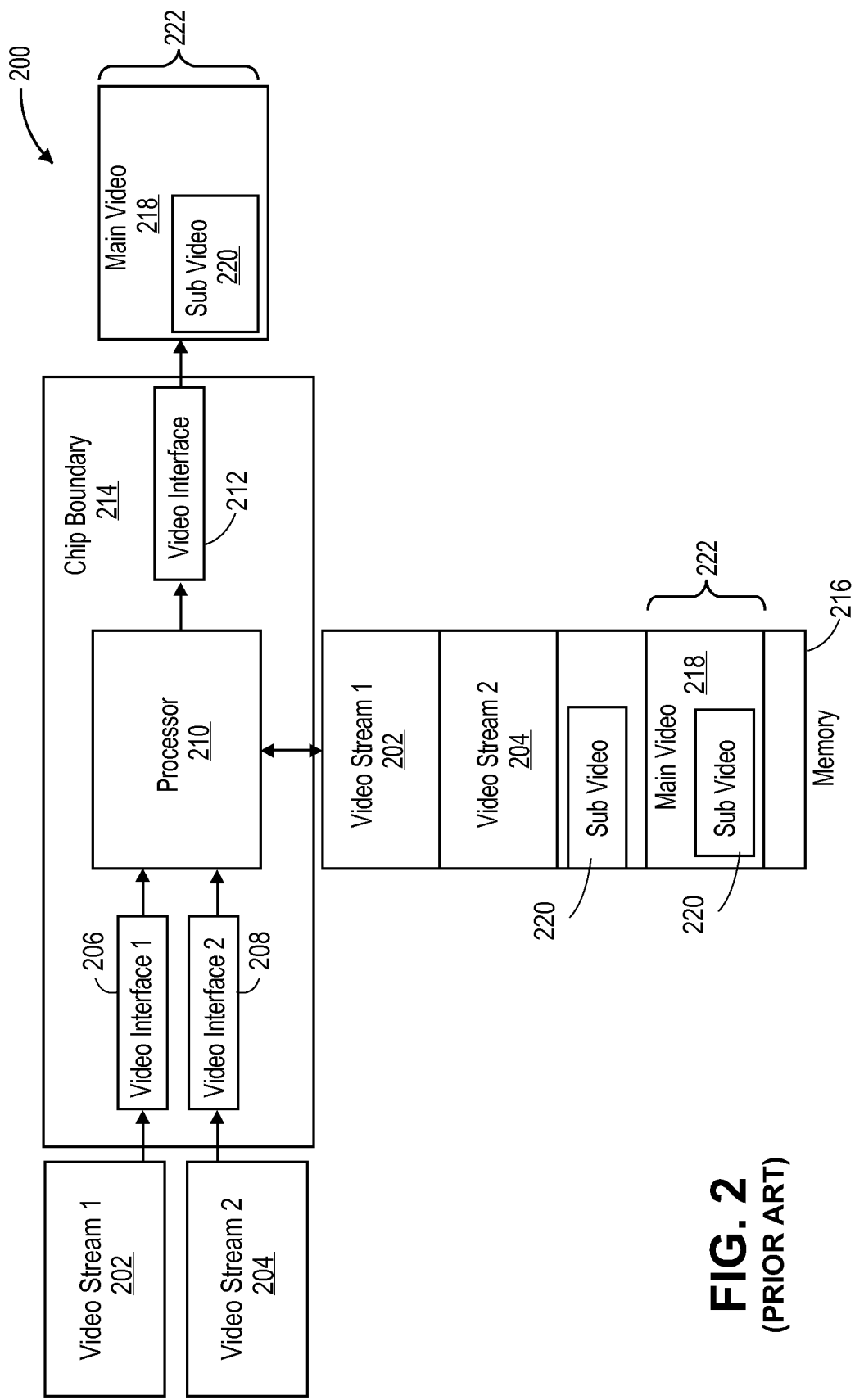
FIG. 2 illustrates a conventional picture-in-picture implementation designed to operate on a processor-based platform.

A mechanism for memory reduction in picture-in-picture video generation is disclosed. A method of embodiments of the invention includes receiving, from a transmitting device, a plurality of video streams at a receiving device coupled to the transmitting device, wherein a first video stream of the plurality of video streams is designated to be displayed as a main video and one or more other video streams of the plurality of video streams are designated to be displayed as one or more sub videos to the main video. The method further includes transforming the one or more other video streams into the one or more sub videos, temporarily holding the one or more sub videos in a compressed frame buffer, and merging, via pixel replacement, the main video and the one or more sub videos into a final video image capable of being displayed on a single screen utilizing a display device, wherein pixel replacement is performed such that the one or more sub videos occupy one or more sections of pixels of screen space pixels occupied by the main video. Further details are discussed throughout this document.

As used herein, "network" or "communication network" mean an interconnection network to deliver digital media content (including music, audio/video, gaming, photos, and others) between devices using any number of technologies, such as Serial Advanced Technology Attachment (SATA), Frame Information Structure (FIS), etc. An entertainment network may include a personal entertainment network, such as a network in a household, a network in a business setting, or any other network of devices and/or components. A network includes a Local Area Network (LAN), Wide Area Network (WAN), Metropolitan Area Network (MAN), intranet, the Internet, etc. In a network, certain network devices may be a source of media content, such as a digital television tuner, cable set-top box, handheld device (e.g., personal device assistant (PDA)), video storage server, and other source device. Other devices may display or use media content, such as a digital television, home theater system, audio system, gaming system, and other devices. Further, certain devices may be intended to store or transfer media content, such as video and audio storage servers. Certain devices may perform multiple media functions, such as cable set-top box can serve as a receiver device (receiving information from a cable headend) as well as a transmitter device (transmitting information to a TV) and vice versa. Network devices may be co-located on a single local area network or span over multiple network segments, such as through tunneling between local area networks. A network may also include multiple data encoding and encryption processes as well as identify verification processes, such as unique signature verification and unique identification (ID) comparison. Moreover, an interconnection network may include HDMIs. HDMI refers to an audio-video interface for transmitting uncompressed digital data, and represents a digital alternative to conventional analog standards, such as coaxial cable, radio frequency (RF), component video, etc. HDMI is commonly used to connection various devices, such as set-top boxes, digital video disk (DVD) players, game consoles, computer systems, etc., with televisions, computer monitors, and other display devices. For example, an HDMI can be used to connect a transmitting device to a receiving device and further to other intermediate and/or peripheral devices, such as a separate display device, etc.

Figure 3:
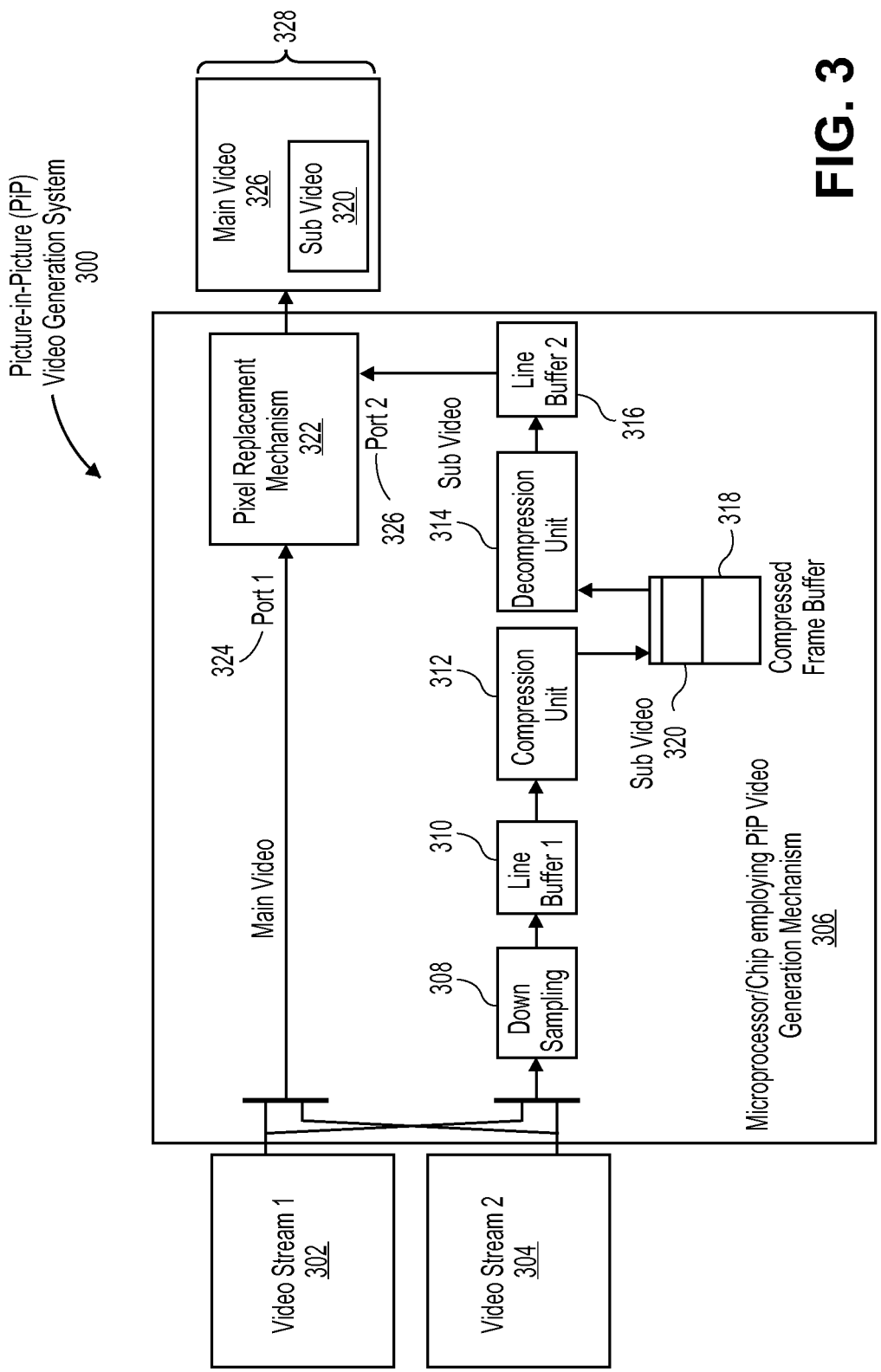
FIG. 3 illustrates a picture-in-picture video generation system according to one embodiment of the invention.

FIG. 3 illustrates a picture-in-picture video generation system 300 according to one embodiment of the invention. In one embodiment, PiP video generation system 300 employs a PiP video generation mechanism at a microprocessor or chip 306 to provide a novel combination of real-time frame compression, at compression unit 312, and decompression, at decompression unit 314, using a compressed frame buffer 318 and on-the-fly pixel replacement process, at pixel replacement unit or mechanism 322, to reduce memory requirements and eliminate the conventional requirements for having large amounts of memory, such as frame memory, for performing PiP video generation. Video stream 302 and video stream 304 are selected by a user to be merged into and displayed as a single video image 328 on a display device at the end of the PiP video generation process 300. In the illustrated embodiment, video stream 302 is selected and designated to serve as main video 326 (also referred to as primary video), while video stream 304 is selected and designated to serve as sub video 320 (also referred to as secondary video). Two video streams 302, 304 and their corresponding main video 326 and sub video 320 are merely used as examples for brevity and clarity and it is contemplated that the number of inputs are not limited to merely two video streams. For example, if there one video stream that is designated and displayed as a main video, any number of other video streams can be designated and displayed as sub videos. Throughout this document, two video streams designated as a main video and a sub video are illustrated and discussed, as aforementioned, as examples for brevity and clarity. Additionally, in reference to this invention, terms "main" and "sub" are synonymous to "primary" and "secondary", respectively. For example, "main video" is also referred to as "primary video", while "sub video" is also referred to as "secondary video". Similarly, it is contemplated that several ratios, components, etc., are merely used as examples for brevity and simplicity (e.g., a ratio may be 5:1 or 10:1, etc.; a port may include an HDMI or a non-HDMI port, etc.).

Given that video steam 302 is designated to be displayed as main video 326 and thus does not require any augmentation (such as down-sampling, compression, decompression, etc.), it is taken directly for pixel replacement via pixel replacement mechanism 322 through port 1 324. Video steam 304, on the other hand, starts with going through a process of down-sampling 308. In down-sampling 308, video stream 304 is down-sampled to a reduced size based on a defined ratio (such as a ratio of 5:1, i.e., 5 lines are reduced to 1 line). It is contemplated that any down-sampling ratio can be defined for down-sampling as necessitated or desired. The down-sampled version of video stream 304 is then passed through line buffer 310 (e.g., line by line or several lines at a time as necessitated or desired) and further through a compression unit 312 for compression using, for example, an image compression algorithm.

The down-sampled and compressed version of video stream 304, now sub video 320, is sent to and temporarily held in compressed frame buffer 318. Any number of lines (including a minimum and/or minimum number of lines, rows, sub-frames, etc.) and a variable size or length of bit streams (e.g., 25 Kbyte, 50 Kbyte, 100 Kbyte, etc.) of sub video 320 may be sent to and stored in compressed frame buffer 318. Compressed frame buffer 318, in one embodiment, receives and temporarily stores any number of lines or sub-frames of sub video 320 according to any number of video compression and decompression techniques. In another embodiment, the compression and decompression processes are row-based (as opposed, for example, to frame-based). A row includes a set of lines that fit and are compatible with the transform algorithm that is used in the processes of compression at compression unit 312 and decompression at decompression unit 314. Sub video 320 is then sent (e.g., line by line, row by row, frame by frame, etc.) from compressed frame buffer 318 to a decompression unit 314 for decompression.

In one embodiment, another line buffer, line buffer 316, is designated to serve as transit or pit stop to temporarily store and transport lines, rows or frames of sub video 320 to a pixel replacement mechanism 322 for pixel replacement. In one embodiment, pixel replacement is performed to merge and synchronize sub video 320 with main video 326, while line buffer 316 operates as a buffer to provide pixel data of sub video 320 to be gradually overlaid in or imposed on a selected portion of main video 326 so that the merging of sub video 320 with main video 326 is performed accurately and in a synchronized manner. The process of pixel replacement is performed to merge main video 326 and sub video 320 such that main video 326 occupies the entire screen 328, while sub video 320 occupies a section of the screen 328 while being imposed on main video 326. The full and final image 328 is displayed to the user using a displaying device of or coupled to a receiving device, such as TV.

One of the advantages of the aforementioned technique is simply using a compressed frame buffer 318 and a couple of line buffers 310, 316 to implement and perform PiP video generation with all the necessary logic and memory on a single microprocessor chip 306. This allows for notably reducing manufacturing cost for PiP video controller chip by significantly reducing the needed on-chip memory area and the number of pin counts for interfacing with off-chip memory.

Figure 4:
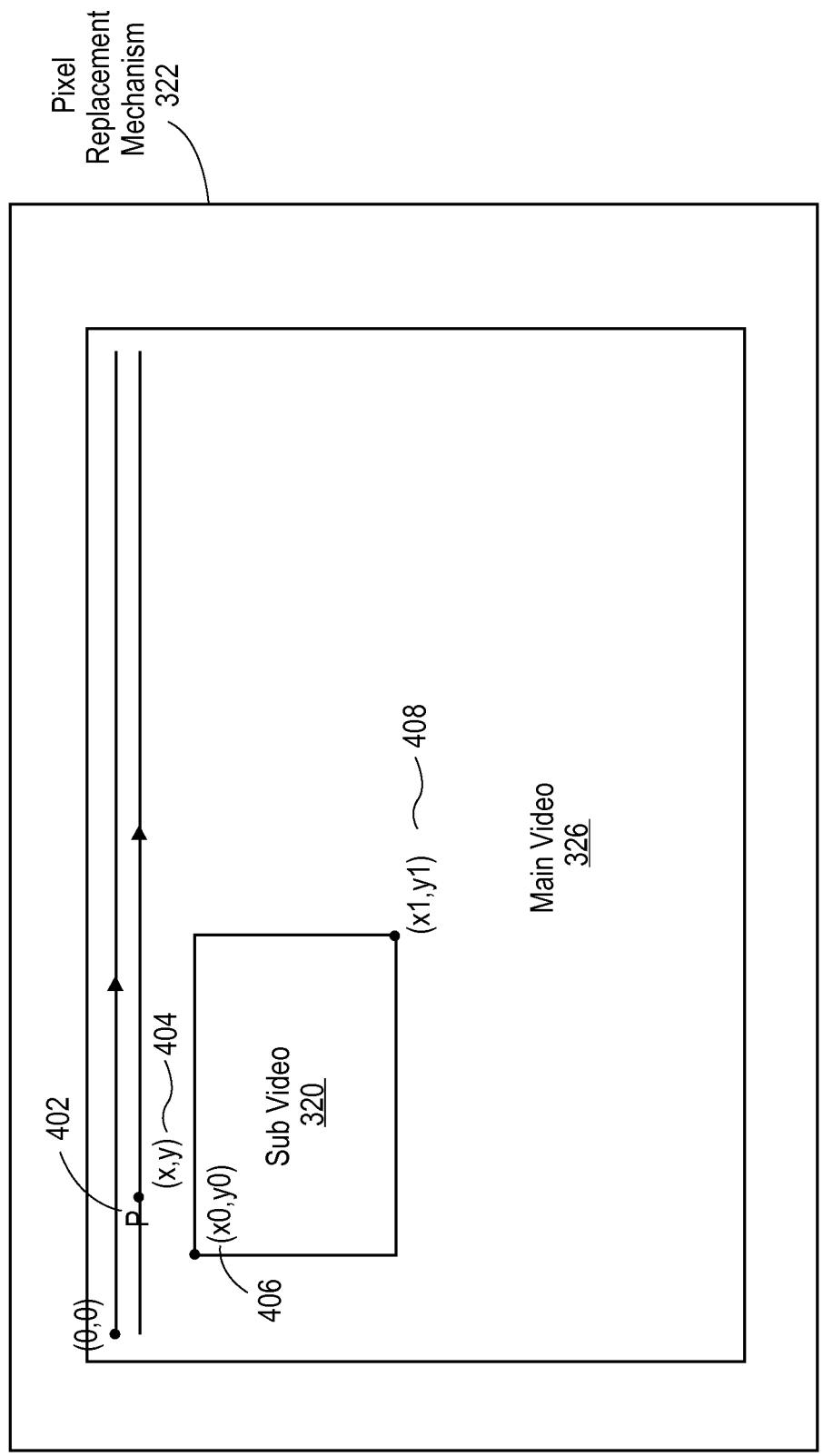
FIG. 4 illustrates pixel replacement of a picture-in-picture video generation system according to one embodiment of the invention.

FIG. 4 illustrates pixel replacement unit or mechanism 322 of a picture-in-picture video generation system 300 according to one embodiment of the invention. In one embodiment, pixel replacement is performed to merge main video 326 and sub video 320 into a single video image. Let us supposed, P 402 is a pixel that is incoming to port 1 (such as port 324 of FIG. 3) of pixel replacement 322. The variable (x, y) 404 indicates the distance from the top left corner of main video 326, while variable (x0, y0) 406 indicates the top left coordinates of sub video 320 and variable (x1, y1) 408 indicates the bottom right coordinates of sub video 320. The process of pixel replacement, via pixel replacement mechanism 322, replaces pixels of main video 326 (through port 1) with pixels of sub video 320 through port 2 (such as port 326 of FIG. 3) as pixel P402 satisfies the following criteria: x is larger than x0 and smaller than x1, while y is larger than y0 and smaller than y1. To prepare sub video-related data (e.g., video image lines or rows) on line buffer 2 (such as line buffer 316 of FIG. 3) to be ready for an on-the-fly pixel replacement, while decompression is performed in advance by predicting the above condition matching. This on-the-fly replacement technique eliminates the conventional large memory requirement for storing main video 326.

In one embodiment, pixel replacement extracts pixels of main video 326 per color depth, and performs color conversion of sub video 320 or main video 326, as necessitated or desired, and further performs down-sampling of sub video 320 per resolution. For example, a certain amount of main video pixels belonging to main video 326 (form the section represented between variables (x0, y0) 406 and (x1, y1) 408, is replaced with sub video pixels of sub video 320, as illustrated between variables (x0, y0) 406 and (x1, y1) 408. Pixel replacement may further include color conversion or adjustment, such as color depth of sub video pixels is adjusted or formatted according to the color-depth of the rest of the main video pixels of main video 326.

Figure 5:
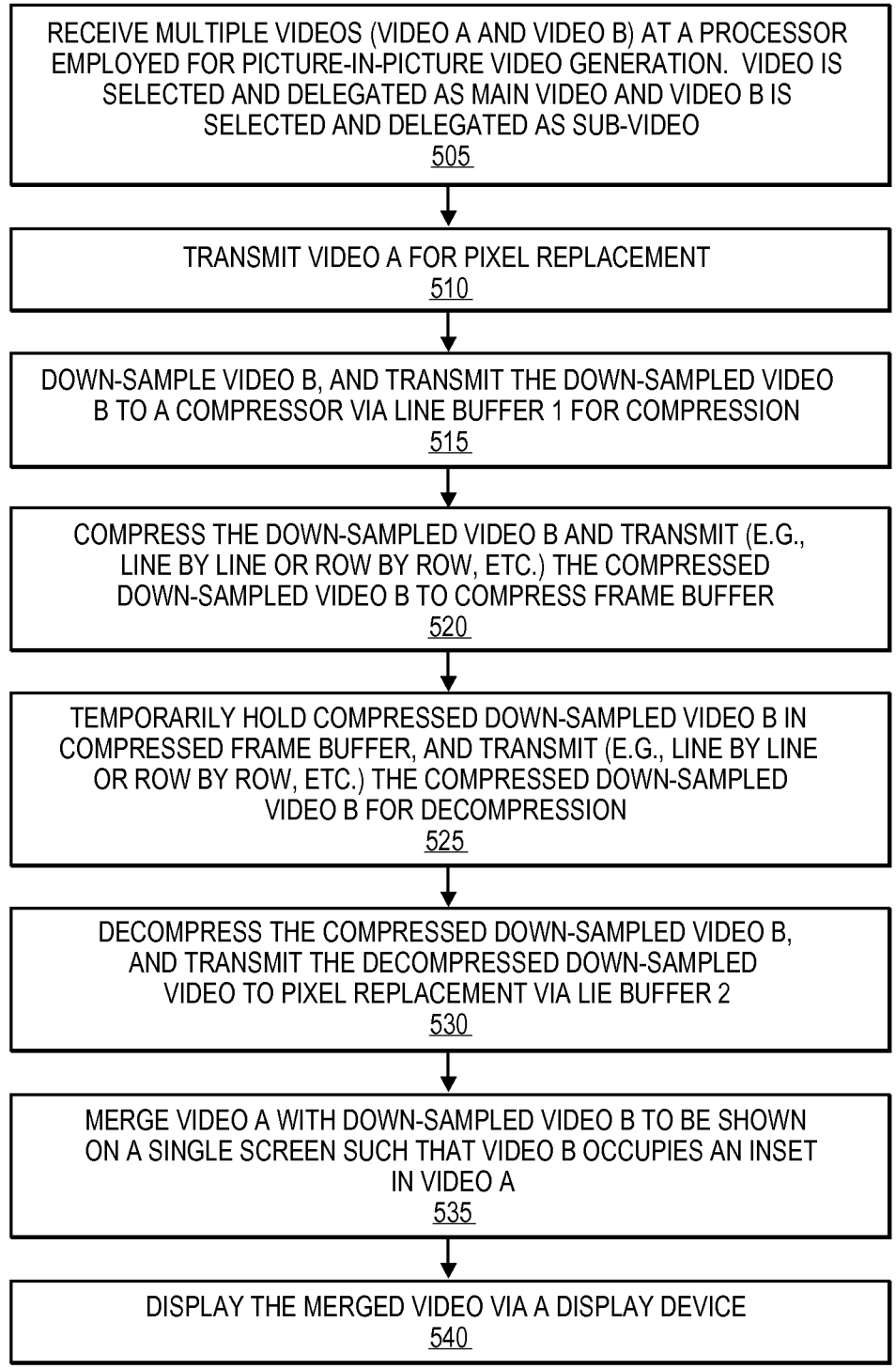
FIG. 5 illustrates a method for picture-in-picture video generation according to one embodiment of the invention.

FIG. 5 illustrates a method 500 for picture-in-picture video generation according to one embodiment of the invention. Method 500 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 500 is performed by PiP video generation system 300 of FIG. 3.

Method 500 starts at block 505 with multiple videos stream, such as two videos A and B, being received at a processor that is used in PiP video generation. It is contemplated that any number of video stream may be chosen by the user for merging and displaying and that two video stream A and B are merely used as an example for brevity and simplicity. At the time of selection, the user delegates or chooses video stream A as main video and video stream B. Once received, video stream A (main video) is transmitted for pixel replacement to a pixel replacement processing unit or mechanism at block 510. Video B (sub video) is down-sampled by a down-sampling unit, and the down-sampled video stream B is transmitted to a compression unit for compression at block 515. The down-sampled video stream B is compressed and then transmitted (e.g., line by line or row by row, etc.) to a compressed frame buffer at block 520.

In one embodiment, the compressed frame buffer is used to temporarily hold the compressed down-sampled video stream B and then, transfer the compressed down-sampled video stream B to a decompression unit for decompression at block 525. The compressed down-sampled video stream may be set to be received and transmitted in any sequence, size, and quantity. At block 530, the compressed down-sampled video stream is received from the compressed frame buffer (e.g., line by line, row by row, or frame by frame, etc.) and decompressed and transmitted, as sub video B, to the pixel replacement mechanism for pixel replacement. This transmission (e.g., line by line, frame by frame, etc.) to the pixel replacement mechanism/unit is performed gradually and in synchronization so that a section of pixels of the main video A is superimposed by the sub video B. At block 535, video A and the sub video are merged into a single video image together during the pixel replacement process. The merging of the videos A and B is performed such that sub video B is imposed on and occupies a section of the pixel space of main video A. At block 540, the merged video (having video A as main video and video B as sub video) is displayed as a single video image on a display device on or coupled with the receiver device (e.g., TV).

Figure 6:
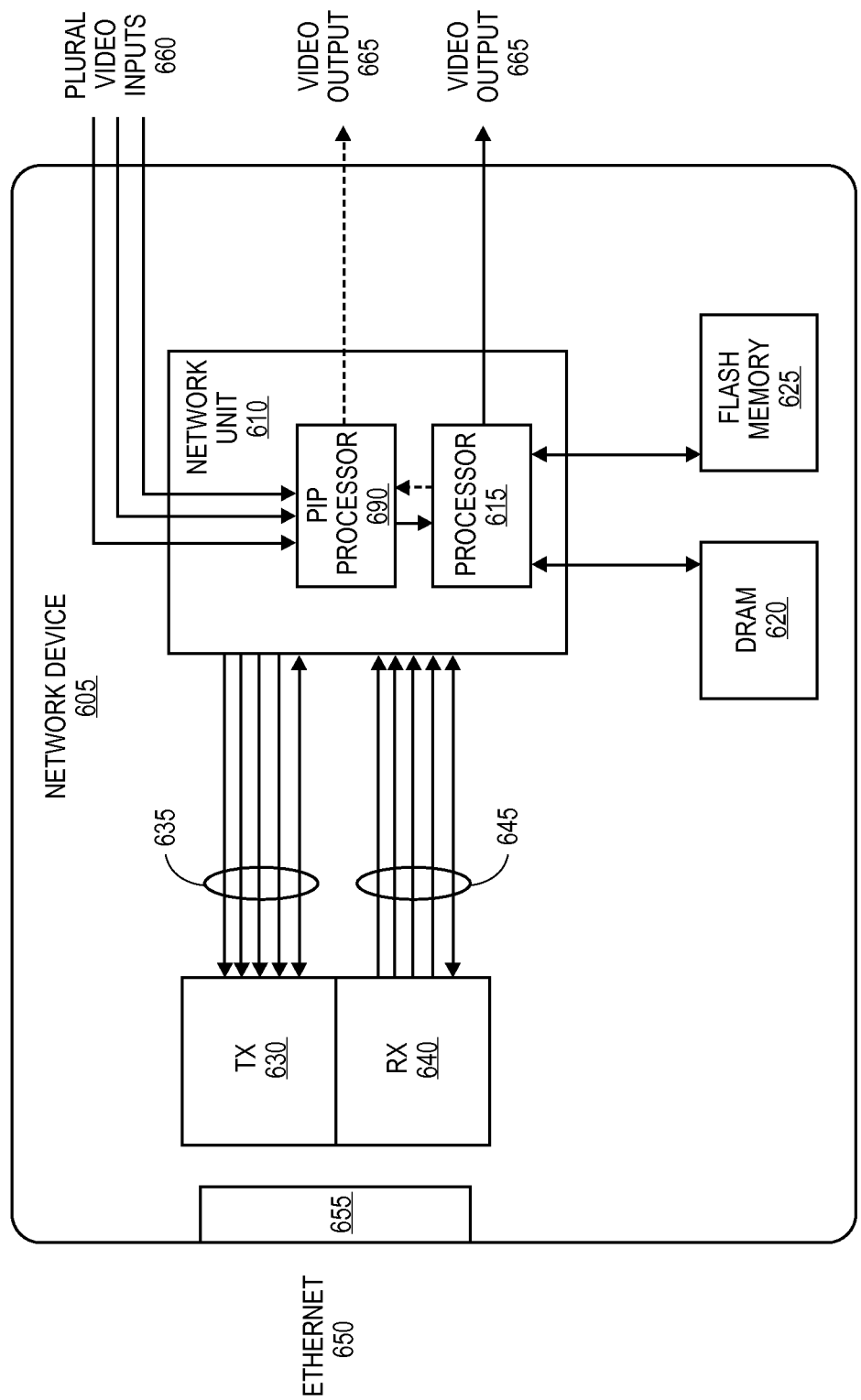
FIG. 6 is an illustration a network computer device employing picture-in-picture video generation according to one embodiment of the invention.

FIG. 6 illustrates components of a network computer device 605 employing picture-in-picture video generation system according to one embodiment of the invention. In this illustration, a network device 605 may be any device in a network, including, but not limited to, a television, a cable set-top box, a radio, a DVD (digital video disk) player, a CD (compact disk) player, a smart phone, a storage unit, a game console, or other media device. In some embodiments, the network device 605 includes a network unit 610 to provide network functions. The network functions include, but are not limited to, the generation, transfer, storage, and reception of media content streams. The network unit 610 may be implemented as a single system on a chip (SoC) or as multiple components.

In some embodiments, the network unit 610 includes a processor 615 for the processing of data. The processing of data may include the generation of media data streams, the manipulation of media data streams in transfer or storage, and the decrypting and decoding of media data streams for usage. The processing data further includes, in one embodiment, a PiP processor 690 to perform embodiments of the present invention, including PiP video generation as described with reference to FIG. 3-5 and throughout this document. In one embodiment, PiP video generation processing is performed on a separate chip or by having the chip integrated into SoC. Further, PiP processor 690 can be placed either before or after processor 615 as indicated by the solid and dotted arrows between the two processors 615, 690 and to video output 665. PiP processor 690 is further configured to receive any number of video inputs 660 from any number of sources. The network device may also include main memory 620 to support network operations, such as RAM (random access memory) including DRAM (dynamic random access memory), SRAM (static random access memory), etc., or other similar memory and flash memory 625 or other nonvolatile memory for storing certain elements as well as information and instructions to be executed by the processors 615, 690.

Memory 620 also may be used for storing data for data streams. DRAM may require refreshing of memory contents, while static random access memory SRAM may not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may certain registers or other special purpose memory. The network device 605 also may comprise a read only memory (ROM) or other static storage device for storing static information and instructions for the processors 615, 690.

The network device 605 may also include a transmitter 630 and/or a receiver 640 for transmission of data on the network or the reception of data from the network, respectively, via one or more network interfaces 655. The transmitter 630 or receiver 640 may be connected to a wired transmission cable, including, for example, an Ethernet cable 650, a coaxial cable, or to a wireless unit. The transmitter 630 or receiver 640 may be coupled with one or more lines, such as lines 635 for data transmission and lines 645 for data reception, to the network unit 610 for data transfer and control signals. Additional connections may also be present. The network device 605 also may include numerous components for media operation of the device, which are not illustrated here.

The device 605 may also be coupled, via an interconnect, to a display or presentation device. In some embodiments, the display may include a liquid crystal display (LCD), a plasma display, a cathode ray tube (CRT) display, or any other display technology, for displaying information or content to an end user. In some embodiments, the display may be utilized to display television programming and other video content, etc. In some environments, the display may include a touchscreen that is also utilized as at least a part of an input device. In some environments, the display may be or may include an audio device, such as a speaker for providing audio information, including the audio portion of a television program. An input device may be coupled to the interconnect for communicating information and/or command selections to the processors 615, 690. In various implementations, the input device may be a keyboard, a keypad, a touch screen and stylus, a voice activated system, or other input device, or combinations of such devices. Another type of user input device that may be included is a cursor control device, such as a mouse, a trackball, or cursor direction keys for communicating direction information and command selections to the one or more processors 615, 690 and for controlling cursor movement on the display.

In some embodiments the device 605 includes one or more ports for the reception or transmission of data. Data that may be received or transmitted may include video data or audio-video data, such as HDMI and HDMI-m data, and may be encrypted for transmission, such as HDCP encrypted data. In some embodiments, the device 605 includes one or more ports for the transmission and/or reception of data for the transfer of content data and one or more ports for the transmission and/or reception of control data, such as command data. The command data may include one or more messages regarding a change of mode of data transmission, and may include acknowledgements regarding the change of mode of data transmission. In addition, the device 605 may include a USB (Universal Serial Bus).

The device 605 may further include one or more antennas for the reception of data via radio signals. The device 605 may also comprise a power device or system, which may comprise a power supply, a battery, a solar cell, a fuel cell, or other system or device for providing or generating power. The power provided by the power device or system may be distributed as required to elements of the device 605.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
    receiving, from a transmitting device, a plurality of video streams at a receiving device coupled to the transmitting device, wherein a first video stream of the plurality of video streams is designated to be displayed as a main video and one or more other video streams of the plurality of video streams are designated to be displayed as one or more sub videos to the main video;
    transforming the one or more other video streams into the one or more sub videos;
    temporarily holding the one or more sub videos in a compressed frame buffer, and wherein the one or more sub videos are predictively compressed according to a down-sampling ratio prior to being held in the compressed frame buffer; and
    merging in a synchronized manner, via on-the-fly pixel replacement, the main video and the one or more sub videos into a final video image capable of being displayed on a single screen utilizing a display device, wherein the on-the-fly pixel replacement includes replacing a first set of pixels of the screen occupied by a section of the main video with a second set of pixels relating to the one or more sub videos, and wherein the one or more sub videos are predictively decompressed in advance of the second set of pixels relating to the one or more sub videos replacing the first set of pixels relating to the main video, wherein the predictive compression and decompression are performed in real-time.

2. The method of claim 1, wherein transforming further comprises:
    down-sampling the one or more other video streams according to a defined down-sampling ratio; and
    transporting the one or more down-sampled videos to a compressor via a first line buffer; and compressing the one or more down-sampled videos.

3. The method of claim 1, wherein transforming further comprises transporting the one or more compressed down-sampled videos as the one or more sub videos into the compressed frame buffer.

4. The method of claim 1, wherein transforming further comprises:
    decompressing the one or more compressed down-sampled videos; and
    transporting the one or more decompressed down-sampled videos as the one or more sub videos to a pixel transformation unit via a second line buffer.

5. The method of claim 1, further comprising transporting the first video as the main video directly to the pixel replacement unit.

6. The method of claim 1, wherein pixel replacement further comprises one or more of extracting pixels per color depth, performing color conversion, and down-sampling per resolution of the one or more other video streams.

7. The method of claim 1, wherein occupying the section comprises pixel replacing main video pixels of the section with sub video pixels, wherein pixel replacing further includes color adjusting the sub video pixels following a color depth formatting of the main video pixels of the main video.

8. The method of claim 1, further comprising displaying the final video image on a display screen of the display device.

9. The method of claim 1, wherein the role of the one video stream as main video and the role of the other video stream as sub-video can be switched from frame to frame.

10. A system comprising:
    a data processing device having a storage medium and a processor coupled with the storage medium, the data processing device further having a mechanism, wherein the mechanism to:
    receive, from a transmitting device, a plurality of video streams at a receiving device coupled to the transmitting device, wherein a first video stream of the plurality of video streams is designated to be displayed as a main video and one or more other video streams of the plurality of video streams are designated to be displayed as one or more sub videos to the main video;
    transform the one or more other video streams into the one or more sub videos;
    temporarily hold the one or more sub videos in a compressed frame buffer, and wherein the one or more sub videos are predictively compressed according to a down-sampling ratio prior to being held in the compressed frame buffer; and merge in a synchronized manner, via on-the-fly pixel replacement, the main video and the one or more sub videos into a final video image capable of being displayed on a single screen utilizing a display device, wherein the on-the-fly pixel replacement includes replacing a first set of pixels of the screen occupied by a section of the main video with a second set of pixels relating to the one or more sub videos, and wherein the one or more sub videos are predictively decompressed in advance of the second set of pixels relating to the one or more sub videos replacing the first set of pixels relating to the main video, wherein the predictive compression and decompression are performed in real-time.

11. The system of claim 10, wherein when transforming, the mechanism is further to:
down-sample the one or more other video streams according to a defined down-sampling ratio; and
transport the one or more down-sampled videos to a compressor via a first line buffer; and compress the one or more down-sampled videos.

12. The system of claim 10, wherein when transforming, the mechanism is further to transport the one or more compressed down-sampled videos as the one or more sub videos into the compressed frame buffer.

13. The system of claim 10, wherein when transforming, the mechanism is further to:
decompress the one or more compressed down-sampled videos; and
transport the one or more decompressed down-sampled videos as the one or more sub videos to a pixel transformation unit via a second line buffer.

14. The system of claim 10, wherein the mechanism is further to transport the first video as the main video directly to the pixel replacement unit.

15. The system of claim 10, wherein the mechanism is further to be able to switch role of the one video stream as main video and the role of the other video stream as sub-video from frame to frame.

16. An apparatus comprising a data processing device having a storage medium and a processor coupled with the storage medium, the processor to:
receive, from a transmitting device, a plurality of video streams at a receiving device coupled to the transmitting device, wherein a first video stream of the plurality of video streams is designated to be displayed as a main video and one or more other video streams of the plurality of video streams are designated to be displayed as one or more sub videos to the main video;
transform the one or more other video streams into the one or more sub videos;
temporarily hold the one or more sub videos in a compressed frame buffer, and wherein the one or more sub videos are predictively compressed according to a down-sampling ratio prior to being held in the compressed frame buffer; and
merge in a synchronized manner, via on-the-fly pixel replacement, the main video and the one or more sub videos into a final video image capable of being displayed on a single screen utilizing a display device, wherein the on-the-fly pixel replacement includes replacing a first set of pixels of the screen occupied by a section of the main video with a second set of pixels relating to the one or more sub videos, and wherein the one or more sub videos are predictively decompressed in advance of the second set of pixels relating to the one or more sub videos replacing the first set of pixels relating to the main video, wherein the predictive compression and decompression are performed in real-time.

17. The apparatus of claim 16, wherein when transforming, the processor is further to:
down-sample the one or more other video streams according to a defined down-sampling ratio; and
transport the one or more down-sampled videos to a compressor via a first line buffer and compress the one or more down-sampled videos.

18. The apparatus of claim 16, wherein when transforming, the processor is further to transport the one or more compressed down-sampled videos as the one or more sub videos into the compressed frame buffer.

19. The apparatus of claim 16, wherein when transforming, the processor is further to:
decompress the one or more compressed down-sampled videos; and
transport the one or more decompressed down-sampled videos as the one or more sub videos to a pixel transformation unit via a second line buffer.

20. The apparatus of claim 16, wherein the processor is further to be able to switch role of the one video stream as main video and the role of the other video stream as sub-video from frame to frame.

* * * * *